(12) United States Patent
Cheng et al.

(10) Patent No.: US 10,154,003 B2
(45) Date of Patent: Dec. 11, 2018

(54) METHOD FOR ACQUIRING IDENTIFIER OF TERMINAL IN NETWORK, MANAGEMENT NETWORK ELEMENT AND STORAGE MEDIUM

(71) Applicant: ZTE CORPORATION, Guangdong (CN)

(72) Inventors: Li Cheng, Shenzhen (CN); Tong Rui, Shenzhen (CN); Mo Sun, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 9 days.

(21) Appl. No.: 15/325,445

(22) PCT Filed: Apr. 16, 2015

(86) PCT No.: PCT/CN2015/076769
§ 371 (c)(1),
(2) Date: Jan. 11, 2017

(87) PCT Pub. No.: WO2016/008320
PCT Pub. Date: Jan. 21, 2016

(65) Prior Publication Data
US 2017/0171149 A1      Jun. 15, 2017

(30) Foreign Application Priority Data

Jul. 15, 2014   (CN) .......................... 2014 1 0337512

(51) Int. Cl.
*H04W 8/26* (2009.01)
*H04L 29/12* (2006.01)
(Continued)

(52) U.S. Cl.
CPC ........ *H04L 61/2007* (2013.01); *H04L 61/103* (2013.01); *H04L 61/1535* (2013.01);
(Continued)

(58) Field of Classification Search
CPC ............. H04L 61/2007; H04L 61/2517; H04L 61/1547; H04L 61/2046; H04L 63/1441;
(Continued)

(56) References Cited

U.S. PATENT DOCUMENTS

| | | | | |
|---|---|---|---|---|
| 2009/0109925 | A1* | 4/2009 | Nakamura ............ | H04L 63/062 370/331 |
| 2011/0003546 | A1* | 1/2011 | Xiang ................... | H04W 60/00 455/26.1 |

(Continued)

FOREIGN PATENT DOCUMENTS

| | | |
|---|---|---|
| CN | 101150598 A | 3/2008 |
| CN | 101483672 A | 7/2009 |

(Continued)

*Primary Examiner* — Phuc H Tran
(74) *Attorney, Agent, or Firm* — Ling Wu; Stephen Yang; Ling and Yang Intellectual Property

(57) ABSTRACT

The embodiment of the present invention discloses a method for acquiring an identifier of a terminal in a network. The method includes: acquiring a device identifier of a current terminal which is registered in a network, herein the current terminal is a mobile user; and allocating a corresponding network identifier to the current terminal according to the device identifier of the current terminal such that the current terminal transmits data in the network by using the allocated network identifier, herein, the network identifier is a fixed public network Internet Protocol IP address or a fixed public network IP address and port number segment, allocated to the current terminal. The present invention further discloses a management network element and a computer storage medium.

15 Claims, 8 Drawing Sheets

(51) Int. Cl.
*H04L 29/06* (2006.01)
*H04W 8/24* (2009.01)
*H04W 36/00* (2009.01)
*H04W 8/08* (2009.01)

(52) U.S. Cl.
CPC ...... *H04L 61/1547* (2013.01); *H04L 61/2046* (2013.01); *H04L 61/2507* (2013.01); *H04L 61/2514* (2013.01); *H04L 61/2517* (2013.01); *H04L 63/1441* (2013.01); *H04W 8/24* (2013.01); *H04W 8/26* (2013.01); *H04W 36/0011* (2013.01); *H04L 61/6054* (2013.01); *H04L 2463/146* (2013.01); *H04W 8/08* (2013.01)

(58) Field of Classification Search
CPC ............... H04L 61/1535; H04L 61/103; H04L 61/2514; H04L 61/2507; H04L 2463/146; H04L 61/6054; H04W 36/0011; H04W 8/24; H04W 8/26; H04W 8/08
See application file for complete search history.

(56) References Cited

U.S. PATENT DOCUMENTS

| | | |
|---|---|---|
| 2011/0047256 A1 | 2/2011 | Babu et al. |
| 2014/0355542 A1* | 12/2014 | Zhang .................. H04W 4/027 370/329 |
| 2016/0234164 A1* | 8/2016 | Kweon .................. H04W 8/08 |

FOREIGN PATENT DOCUMENTS

| | | |
|---|---|---|
| CN | 102299942 A | 12/2011 |
| CN | 102790812 A | 11/2012 |
| CN | 103067268 A | 4/2013 |

* cited by examiner

METHOD FOR ACQUIRING IDENTIFIER OF TERMINAL IN NETWORK, MANAGEMENT NETWORK ELEMENT AND STORAGE MEDIUM

TECHNICAL FIELD

The present disclosure relates to an allocation technology of terminal identifiers, in particular to a method for acquiring an identifier of a terminal in a network, a management network element and a computer storage medium.

BACKGROUND

From moving states, terminals may be divided into two types. One type refers to terminals at fixed positions, such as home terminals; and the other type refers to terminals in a moving state, e.g., mobile terminals which are easily carried, such as mobile phones, Personal Digital Assistants PDAs and so on. Herein, when a home terminal accesses the Internet, an effective Internet Protocol IP address needs to be applied from the Internet. The IP address has dual identities, and it not only represents the identity of the home terminal, but also represents a network topology location of the home terminal. In other words, for a terminal at a fixed position, the IP address applied from the Internet can identify the dual identities of the terminal.

For a mobile terminal (a mobile user), by taking a mobile terminal A as an example, when the mobile terminal A moves from a control area of one access gateway to a control area of another access gateway, i.e., from one network topology location to another network topology location, the mobile terminal A needs to acquire a corresponding IP address in each of different control areas, and thus can successfully access the network.

In consideration of the shortage in IP address resources, operators change the mode of allocating IP addresses to mobile users. Further, the original mode that public network IP addresses are directly allocated to the mobile users is changed to a mode that firstly private network IP addresses are allocated to the mobile users and then the private network IP addresses are translated into the public network IP addresses through a pre-deployed operation-level Network Address Translation NAT device to save the IP address resources when the mobile users accesses the Internet.

However, since a mobile user is usually in a moving state and may be accessed the network through different access devices or different operation-level NAT devices, consequently, when the mobile terminal is accessed the Internet, private network IP addresses allocated thereto and translated public network IP addresses are different. This causes the following problems to operators and service providers:

for the operators, each mobile terminal in the network is accessed the network by using different IP addresses, such that the search for illegal operation terminals cannot be realized, i.e., the tracing to the terminal cannot be realized, and further the network security cannot be guaranteed. For the service providers, since network access addresses of the same mobile terminal change ceaselessly, effective tracking and service access analysis cannot be performed on the mobile terminal, and further better service cannot be provided for the mobile terminal.

SUMMARY

In order to solve the technical problems existing the related art, the embodiments of the present disclosure provide a method for acquiring an identifier of a terminal in a network, a management network element and a computer storage medium, such that the fixed identity of each mobile user can be identified in the network to satisfy the demands of operators in aspects such as tracing and security and so on.

The technical solutions of the embodiments of the present disclosure are implemented as follows:

the embodiment of the present disclosure provides a method for acquiring an identifier of a terminal in a network, including:

acquiring a device identifier of a current terminal which is registered in a network, herein the current terminal is a mobile user; and allocating a corresponding network identifier to the current terminal according to the device identifier of the current terminal such that the current terminal transmits data in the network by using the allocated network identifier;

herein, the network identifier is a fixed public network Internet Protocol IP address or a fixed public network IP address and port number segment allocated to the current terminal.

In the solution, the step of allocating a corresponding network identifier to the current terminal according to the device identifier of the current terminal includes: search to determine whether there is the public network IP address or the public network IP address and the port number segment corresponding to the device identifier of the current terminal in a preconfigured first mapping table;

allocating the searched public network IP address or public network IP address and port number segment to the current terminal when the public network IP address or the public network IP address and the port number segment is searched out; and selecting an idle public network IP address, or an idle public network IP address and an idle port number segment, or a non-idle public network IP address and an idle port number segment as a fixed network identifier of the current terminal to allocate the fixed network identifier to the current terminal when the public network IP address or the public network IP address and port number segment is not searched out; herein, the first mapping table records a corresponding relation between terminal device identifiers and network identifiers.

In the solution, the method further includes:

acquiring identifier information of a node to which the current terminal belongs, and adding the node identifier information to the first mapping table; or, acquiring a private network IP address allocated to the current terminal by an access device which the current terminal is accessed and the identifier information of the node to which the current terminal belongs, and adding the private network IP address and the node identifier information to the first mapping table.

In the solution, after adding the node identifier information to the first mapping table or adding the private network IP address and the node identifier information to the first mapping table, the method further includes:

when learning about that the current terminal left the network, deleting the node identifier information, or the private network IP address and the node identifier information corresponding to an identifier of the current terminal in the first mapping table;

when learning about that a handover from the access device to a new access device was performed on the current terminal and the two access devices belong to a same node, acquiring a new private network IP address allocated to the current terminal by the new access device, and updating the private network IP address of the current terminal in the first mapping table to be the new private network IP address; and when learning about that a handover from the access device to a new access device was performed on the current terminal and the two access devices do not belong to a same node, acquiring a new private network IP address allocated to the current terminal by the new access device, acquiring node identifier information of a new node to which the current terminal belongs; and updating the private network IP address of the current terminal in the first mapping table to be the new private network IP address, and updating the node identifier information of the current terminal in the first mapping table to be the new node identifier information.

In the solution, the method further includes:

when receiving a tracing address search request which carries a to-be-traced IP address, searching for a private network IP address or the private network IP address and a node identifier of a terminal corresponding to the to-be-traced IP address in the first mapping table, and using the private network IP address or the private network IP address and the node identifier information as a response message of the tracing address search request, and transmitting the response message;

or, when receiving the tracing address search request which carries the to-be-traced IP address, searching for a terminal device identifier corresponding to the to-be-traced IP address in the first mapping table; and then searching for a terminal user account corresponding to the terminal device identifier in pre-synchronized terminal authentication information, using the terminal user account information as the response message of the tracing address search request, and transmitting the response message, herein, the to-be-traced IP address is a public network IP address or a public network IP address and a port number.

In the solution, the method further includes: a management network element transmitting the network identifier allocated to the current terminal to the node to which the current terminal belongs such that the node forms a second mapping table, herein the second mapping table records a corresponding relation among the device identifier, the network identifier and the private network IP address of the current terminal; and correspondingly, the current terminal transmitting data in the network by using the allocated network identifier includes: when the node acquires first data from the current terminal, acquiring the private network IP address of the current terminal, and searching for the network identifier corresponding to the private network IP address in the second mapping table;

when the node learns about identifier information of a node used for receiving the first data, determining the node used for receiving the first data;

when the node does not learn about the identifier information of the node used for receiving the first data, transmitting a query request to the management network element, and the management network element receiving the query request, searching for an identifier of a node to which a terminal corresponding to a destination address of the first data belongs in the first mapping table, and transmitting the searched node identifier; and the node receiving the node identifier searched out by the management network element, and determining a node with the node identifier as the node used for receiving the first data; and the node transmitting the first data to the determined node used for receiving the first data through a data tunnel by using the network identifier searched out by the node.

The embodiment of the present disclosure further provides a management network element, including:

a first acquisition unit arranged to acquire a device identifier of a current terminal which is registered in a network, herein the current terminal is a mobile user; and a first allocation unit arranged to allocate a corresponding network identifier to the current terminal according to the device identifier of the current terminal such that the current terminal transmits data in the network by using the allocated network identifier;

herein, the network identifier is a fixed public network Internet Protocol IP address or a fixed public network IP address and port number segment, allocated to the current terminal.

In the solution, the first allocation unit is further arranged to:

search to determine whether there is the public network IP address or the public network IP address and the port number segment corresponding to the device identifier of the current terminal in a preconfigured first mapping table; when the public network IP address or the public network IP address and the port number segment is searched out, allocate the searched public network IP address or public network IP address and port number segment to the current terminal; and when the public network IP address or the public network IP address and the port number segment is not searched out, select an idle public network IP address, or an idle public network IP address and an idle port number segment, or a non-idle public network IP address and an idle port number segment as a fixed network identifier of the current terminal to allocate to the current terminal, herein, the first mapping table records a corresponding relation between terminal device identifiers and network identifiers.

In the solution, the first acquisition unit is further arranged to: acquire identifier information of a node to which the current terminal belongs, and add the node identifier information to the first mapping table; or, acquire a private network IP address allocated to the current terminal by an access device which the current terminal is accessed and the identifier information of the node to which the current terminal belongs, and add the private network IP address and the node identifier information to the first mapping table.

In the solution, the management network element further includes:

a first deletion unit arranged to, when learning about that the current terminal left the network, delete the node identifier information, or the private network IP address and the node identifier information corresponding to an identifier of the current terminal in the first mapping table;

a first updating unit arranged to, when learning about that a handover from the access device to a new access device was performed on the current terminal and the two access devices belong to a same node, acquire a new private network IP address allocated to the current terminal by the new access device, and update the private network IP address of the current terminal in the first mapping table to be the new private network IP address; and a second updating unit arranged to, when learning about that a handover from the access device to a new access device was performed on the current terminal and the two access devices do not belong to a same node, acquire the new private network IP address allocated to the current terminal by the new access device, acquire node identifier information of a new node to which the current terminal belongs, update the private network IP address of the current terminal in the first mapping table to be the new private network IP address, and update the node identifier information of the current terminal in the first mapping table to be the new node identifier information.

In the technical solution, the management network element further includes:

a first receiving unit arranged to receive a tracing address search request which carries a to-be-traced IP address;

a first searching unit arranged to search for a private network IP address or the private network IP address and a node identifier of a terminal corresponding to the to-be-traced IP address; and a first transmission unit arranged to use the private network IP address or the private network IP address and the node identifier information as a response message of the tracing address search request, and transmit the response message;

or, the first receiving unit arranged to receive the tracing address search request which carries the to-be-traced IP address;

the first searching unit arranged to search for a terminal device identifier corresponding to the to-be-traced IP address in the first mapping table, and then search for a terminal user account corresponding to the terminal device identifier in pre-synchronized terminal authentication information; and the first transmission unit arranged to use the terminal user account information as the response message of the tracing address search request, and transmit the response message, herein the to-be-traced IP address is a public network IP address or a public network IP address and a port number.

In the solution, the management network element further includes:

a second receiving unit arranged to receive a query request, herein the query request is transmitted by the node when the node does not learn about identifier information of a node used for receiving first data when the current terminal transmits the first data;

a second searching unit arranged to search for an identifier of the node to which a terminal corresponding to a destination address of the first data belongs in the first mapping table; and a second transmission unit arranged to transmit the node identifier information.

The embodiment of the present disclosure further provides a computer storage medium storing computer-executable instructions therein, herein the computer-executable instructions are used for executing the abovementioned method for acquiring the identifier of the terminal in the network.

According to the method for acquiring the identifier of the terminal in the network, the management network element and the storage medium provided by the embodiments of the present disclosure, the method includes: acquiring the device identifier of the current terminal which is registered in the network; and allocating the corresponding network identifier to the current terminal according to the device identifier of the current terminal such that the current terminal transmits data in the network by using the allocated network identifier. Herein, the network identifier is a fixed public network IP address or a fixed public network IP address and port number segment, allocated to the current terminal, and the fixed identity of each mobile user can be identified in the network to satisfy the demands of operators in aspects such as tracing and security and so on.

SPECIFIC EMBODIMENTS

The alternative embodiments of the present disclosure will be described below in detail in combination with the drawings. It shall be understood that the alternative embodiments described below are just used for describing and explaining the present disclosure instead of limiting the present disclosure.

The technical solution of the embodiment of the present disclosure is applied to a mobile user terminal, and is particularly applied to a situation that an operator has already allocated a private network IP address to the terminal (mobile user). When the terminal accesses the Internet, a device identifier of the terminal is acquired, and a corresponding public network IP address or a public network IP address and port number segment is allocated to the terminal according to the device identifier of the terminal and is used as an identity identifier of the terminal in the Internet. Herein, since each terminal has a unique device identifier corresponding thereto, and at the same time the device identifier uniquely corresponds to the public network IP address, i.e., the identity identifier of the terminal in the Internet is relatively fixed, compared with the related art in which the public network IP addresses allocated to the terminal frequently change with the movement of the terminal, the terminal has a relatively fixed identifier in the Internet. Therefore, the search for illegal terminals and the realization of security control of users by the operators are more greatly facilitated, and the demands of the operators in aspects such as tracing and security are satisfied.

Figure 1:
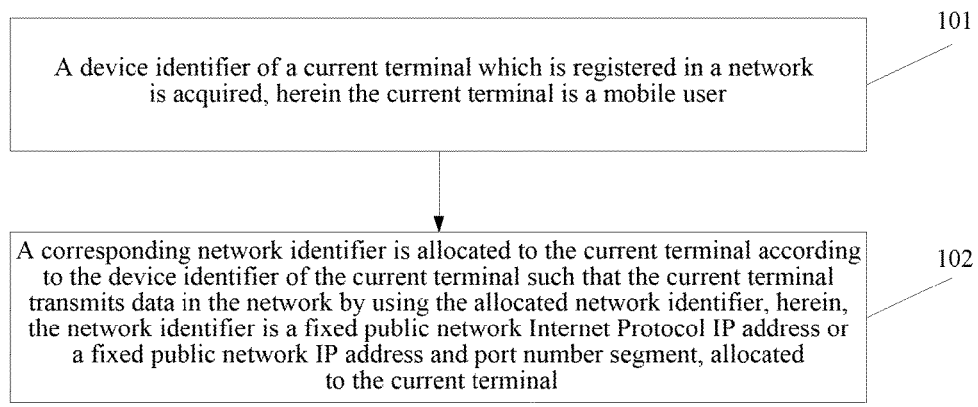
FIG. 1 illustrates a flowchart of a method for acquiring an identifier of a terminal in a network provided by an embodiment of the present disclosure.

A method for allocating a network identifier to a terminal provided by an embodiment of the present disclosure is applied to a management network element. FIG. 1 illustrates a flowchart of a method for acquiring an identifier of a terminal in a network provided by the embodiment of the present disclosure. As illustrated in FIG. 1, the method includes the following steps.

In step 101, a device identifier of a current terminal which is registered in a network is acquired, herein the current terminal is a mobile user.

Here, the network may be the Internet. The terminal includes a portable terminal such as a mobile phone or a Personal Digital Assistant PDA or the like. Alternatively, when the terminal is the mobile phone, the device identifier of the terminal is an International Mobile Subscriber Identification Number IMSI of the mobile phone. When the terminal is the PAD, the device identifier of the terminal is a Media Access Control MAC address of the PAD.

Figure 2:
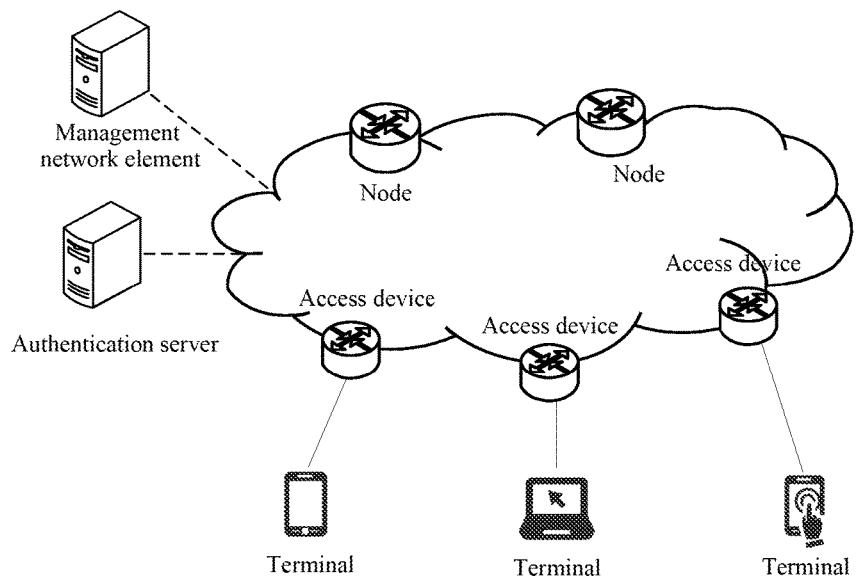
FIG. 2 illustrates a schematic diagram of a first application scenario provided by an embodiment of the present disclosure.

In this step, the device identifier of the terminal in the network is acquired by the management network element. FIG. 2 illustrates a schematic diagram of a first application scenario provided by an embodiment of the present disclosure. In FIG. 2, the involved communication devices include the terminal, an access device which the terminal is accessed, a node to which the access device (the terminal) belongs, and a management network element for allocating a network identifier to the terminal. The involved communication devices may further include: an opposite terminal in communication with the terminal and an opposite node to which the opposite terminal belongs. At a local location of the terminal the terminal is accessed the network through the access device, and the access device acquires the device identifier of the terminal, such as mobile phone IMSI information. The access device transmits the acquired device identifier of the mobile terminal to the management network element, and the management network element acquires the device identifier of the mobile terminal by receiving the device identifier.

In step 102, a corresponding network identifier is allocated to the current terminal according to the device identifier of the current terminal such that the current terminal transmits data in the network by using the allocated network identifier. Herein, the network identifier is a fixed public network Internet Protocol IP address or a public network IP address and port number segment, allocated to the current terminal.

In this step, the operation is implemented by the management network element. In a preconfigured first mapping table, the management network element uses the device identifier of the current terminal as an index to search to determine whether there is a network identifier corresponding to the device identifier of the current terminal. When the network identifier is searched out, the searched network identifier is allocated to the current terminal such that the current terminal transmits a data packet in the Internet by using the allocated network identifier. Herein, the first mapping table records a corresponding relation between device identifiers of terminals which are previously accessed the network and public network IP addresses thereof, or the first mapping table records a corresponding relation between device identifiers of terminals which are previously accessed the network and public network IP addresses and port number segments thereof. Each item of content in the first mapping table may be a table entry. The network identifier may be the public network IP address only, and may also be a combination of the public network IP address and the port number segment.

When the network identifier is not searched out, the current mobile terminal is determined to be a terminal which is newly registered in the network, and an idle public network IP address, or an idle public network IP address and an idle port number segment, or a non-idle public network IP address and an idle port number segment is selected as a network identifier of the newly registered terminal to allocate to the newly registered terminal such that the current terminal transmits the data packet in the Internet by using the allocated network identifier.

Accordingly, it can be seen that, in this solution, in the Internet a corresponding network identifier, such as the public network IP address or the public network IP address and port number segment or the like, is allocated to each of terminals with different device identifiers, and the corresponding network identifier identifies the identity of the terminal in the network. At the same time, since the allocated network identifier is fixed and the device identifier of the terminal is also fixed, the terminal can be very easily searched for in the Internet according to the fixed network identifier allocated to the terminal, and the demands of the operators in aspects such as tracing and security and so on are satisfied.

After the network identifier is allocated to the newly registered terminal, the management network element records the device identifier of the newly registered terminal and the network identifier thereof in the first mapping table.

In this solution, the process of allocating the network identifier to the terminal which is previously accessed the network is similar to the abovementioned process of allocating the network identifier to the newly registered terminal, and thus the process of allocating the network identifier to the terminal which is previously accessed the network is not repetitively described here.

It needs to be stated that the following principles need to be followed when the management network element configures the corresponding network identifier for the terminal.

The public network IP address and the range of port number segment configured for the mobile terminal need to satisfy regulated protocols in Transmission Control Protocol TCP/IP protocol cluster.

A unique public network IP address is arranged to each mobile terminal registered in the network; and/or a same public network IP address is arranged to at least two mobile terminals in the network. When the same public network IP address is arranged to the at least two mobile terminals, different port number segments are arranged to the at least two mobile terminals.

In this solution, after the management network element allocates the network identifier to the current terminal, the method further includes the following steps.

The management network element acquires identifier information of a node to which the current terminal belongs, and adds the node identifier information to the first mapping table; or, acquires a private network IP address allocated to the current terminal by an access device which the current terminal is accessed and identifier information of a node to which the current terminal belongs, and adds the node identifier information and the private network IP address to the first mapping table.

After the management network element adds the node identifier information to the first mapping table or adds the private network IP address and the node identifier information to the first mapping table, the method further includes the following steps.

When the management network element learns about that the current terminal left the network, the management network element deletes the node identifier information, or the private network IP address and the node identifier information corresponding to the identifier of the current terminal in the first mapping table. Refer to subsequent FIG. 4 and description of FIG. 4 for details here.

When the management network element learns about that a handover from the access device to a new access device was performed on the current terminal and the two access devices belong to the same node, the management network element acquires a new private network IP address allocated to the current terminal by the new access device, and updates the private network IP address of the current terminal in the first mapping table to be the new private network IP address. Refer to subsequent FIG. 5 and description of FIG. 5 for details here.

When the management network element learns about that a handover from the access device to a new access device was performed on the current terminal and the two access devices do not belong to the same node, the management network element acquires a new private network IP address allocated to the current terminal by the new access device, acquires node identifier information of a new node to which the current terminal belongs; and updates the private network IP address of the current terminal in the first mapping table to be the new private network IP address, and updates the node identifier information of the current terminal in the first mapping table to be the new node identifier information. Refer to subsequent description for details here.

After the management network element adds the private network IP address or the private network IP address and the node identifier information to the first mapping table, when tracing is implemented, the method further includes the following steps.

When the management network element receives a tracing address search request which carries a to-be-traced IP address, the management network element searches for a private network IP address or the private network IP address and a node identifier of a terminal corresponding to the to-be-traced IP address in the first mapping table, and uses the private network IP address or the private network IP address and the node identifier information as a response message of the tracing address search request, and transmits the response message. Herein, the to-be-traced IP address is a public network IP address or a public network IP address and a port number. Refer to subsequent FIG. 8 and description of FIG. 8 for details here.

Or, when the management network element receives a tracing address search request which carries a to-be-traced IP address when the tracing is implemented, the management network element searches for a terminal device identifier corresponding to the to-be-traced IP address in the first mapping table. The management network element searches for a terminal user account corresponding to the terminal device identifier in pre-synchronized terminal authentication data, and uses the terminal user account information as a response message of the tracing address search request, and transmits the response message. Herein, the to-be-traced IP address is a public network IP address or a public network IP address and a port number. Refer to subsequent FIG. 9 and description of FIG. 9 for details here.

After the management network element allocates the network identifier to the current terminal, the management network element transmits the network identifier allocated to the current terminal to the node to which the current terminal belongs such that the node forms a second mapping table. Herein, the second mapping table records a corresponding relation among the device identifier of the current terminal, the network identifier and the private network IP address of the current terminal. Correspondingly, the current terminal transmitting data in the network by using the allocated network identifier includes the following steps. When the node acquires first data from the current terminal, the private network IP address of the current terminal is acquired, and the network identifier corresponding to the private network IP address is searched for in the second mapping table. When the node learns about identifier information of a node used for receiving the first data, the node used for receiving the first data is determined. When the node does not learn about the identifier information of the node used for receiving the first data, a query request is transmitted to the management network element, and the management network element receives the query request, searches for a node identifier of the node to which a terminal corresponding to a destination address of the first data belongs in the first mapping table, and transmits the searched node identifier. The node receives the node identifier searched out by the management network element, and determines the node with the node identifier as the node used for receiving the first data. The node transmits the first data to the node used for receiving the first data through a data tunnel by using the network identifier searched out by the node. Refer to subsequent FIG. 6 and FIG. 7 and description of FIG. 6 and FIG. 7 for details here.

This solution will be further described through the various embodiments and the corresponding drawings below.

Figure 3:
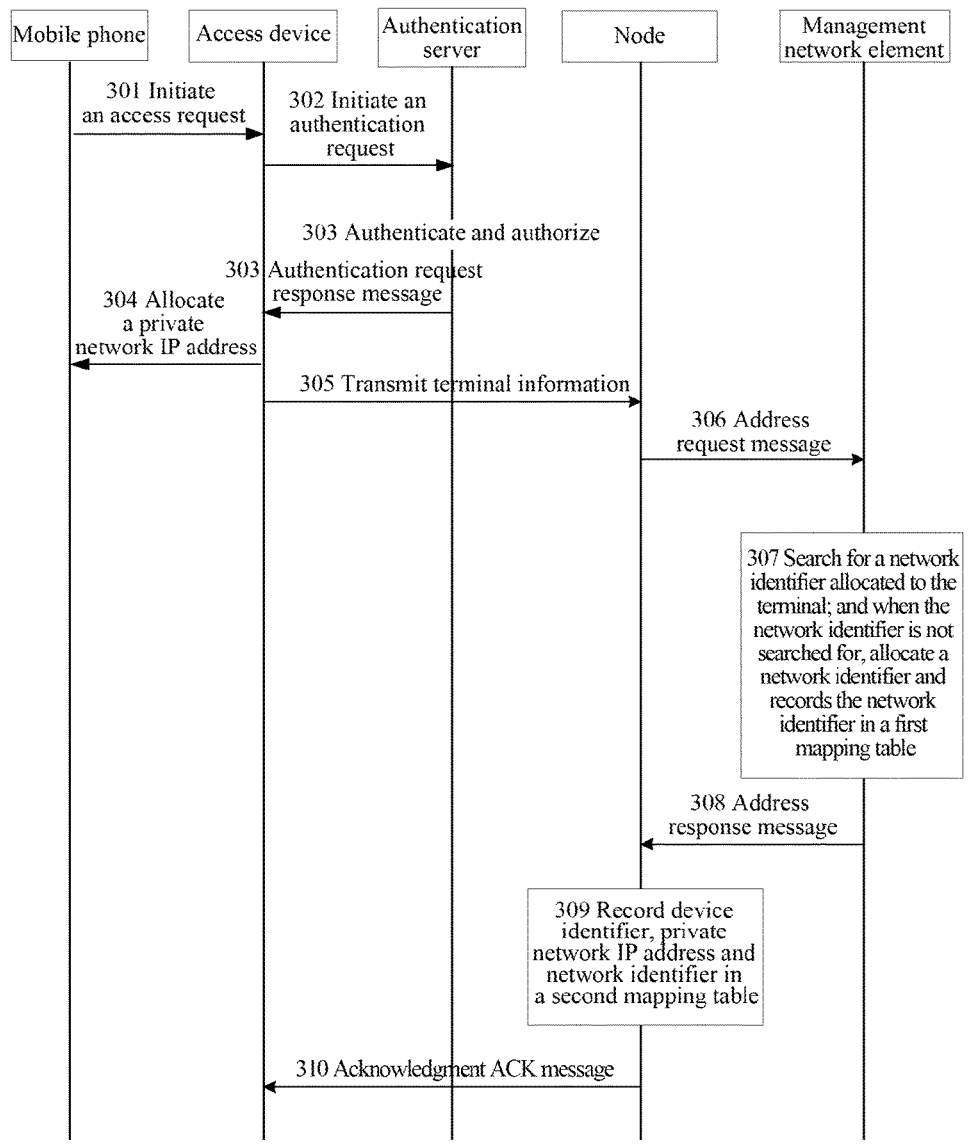
FIG. 3 illustrates a schematic diagram of a specific embodiment of a method for acquiring an identifier of a terminal in a network provided by the present disclosure.

FIG. 3 illustrates a flowchart of a specific embodiment of a method for acquiring an identifier of a terminal in a network provided by an embodiment of the present disclosure. As shown in FIG. 3, the method includes the following steps.

In step 301, a mobile phone initiates an access request to an access device.

In step 302, the access device initiates an authentication request to an authentication server.

In step 303, the authentication server performs identity authentication on the mobile phone and grants corresponding authorities to the mobile phone after the authentication passes; and the authentication server returns a response message of the authentication request to notify the access device about that the mobile phone has already passed the authentication.

In step 304, the access device allocates a private network IP address to the mobile terminal.

Refer to the existing relevant description for specific implementation processes of the steps 301-304.

In step 305, the access device extracts IMSI information of the mobile phone, and uses the IMSI information and the private network IP address allocated to a user as terminal information and transmits the terminal information to a node.

Here, the terminal information such as the IMSI and the private network IP address of the mobile phone and so on may be transmitted through operator-defined signaling interfaces in self-defined message forms, and may also be transmitted by means of Remote Authentication Dial In User Service RADIUS charging messages. When the terminal information is transmitted by means of the RADIUS charging messages, the signaling interfaces need to satisfy the requirements of RADIUS standard protocols.

In step 306, after the node receives the terminal information such as the IMSI and the private network IP address of the mobile phone and so on transmitted by the access device, the node transmits an address request message to a management network element.

Here, the address request message carries the terminal information such as the IMSI and the private network IP address of the mobile phone and so on.

In step 307, after the management network element receives the address request message, the management network element uses the IMSI information of the mobile phone as an index to search to determine whether a network identifier corresponding to the IMSI information of the mobile phone in a configured first mapping table. When the network identifier is searched out, the management network element allocates the searched network identifier to the mobile phone. Alternatively, when the network identifier is searched out, the management network element may add information such as the private network IP address and the node identifier of the node to which the mobile phone belongs and so on to the first mapping table.

When the network identifier is not searched out, the mobile phone is determined to be a mobile phone which is newly registered in the network, and a public network IP address in an idle state, or an idle public network IP address and an idle port number segment, or a non-idle public network IP address and an idle port number segment at current is selected as a network identifier of the mobile phone to allocate to the mobile phone. The IMSI of the mobile phone, the network identifier, the identifier of the node to which the mobile phone belongs and the private network IP address are considered as a corresponding relation to be added to the first mapping table.

The first mapping table may be specifically a static mapping table and is configured through a static mapping method. A first mapping table shown in Table 1 is only used as an alternative embodiment of the first mapping table of the present disclosure, and does not cover all first mapping tables of the present disclosure. For example, the first mapping table of the embodiment of the present disclosure may further include three table entries, i.e., terminal device identifier, network identifier and node identifier.

TABLE 1

| Terminal device identifier | Network identifier | Private network IP address | Node identifier |
|---|---|---|---|

In step 308, the management network element returns an address response message to the node.

Here, the address response message carries the network identifier such as the public network IP address or the public network IP address and the port number segment allocated by the management network element to the mobile phone.

In step 309, the node receives the network identifier of the mobile phone transmitted by the management network element, and records information such as the IMSI information, the private network IP address, the network identifier and the like of the mobile phone in a second mapping table.

In step 310, the node returns an acknowledgment ACK message to the access device to notify the access device that the management network element has already allocated the network identifier to the mobile phone.

In the solution, when the interaction is performed between the management network element and the node, the interacted information is transmitted through operator-defined signaling interfaces.

Accordingly, it can be seen that, in this solution, in the Internet, a corresponding network identifier, such as a public network IP address or a public network IP address and a port number segment or the like, is allocated to each of terminals with different device identifiers, and the identity of the terminal in the network is identified. At the same time, since the allocated network identifier is fixed and the device identifier of the terminal is also fixed, and the terminal can be very easily searched for in the Internet according to the fixed network identifier allocated to the terminal, and the demands of the operators in aspects such as tracing and security and so on are satisfied.

Figure 4:
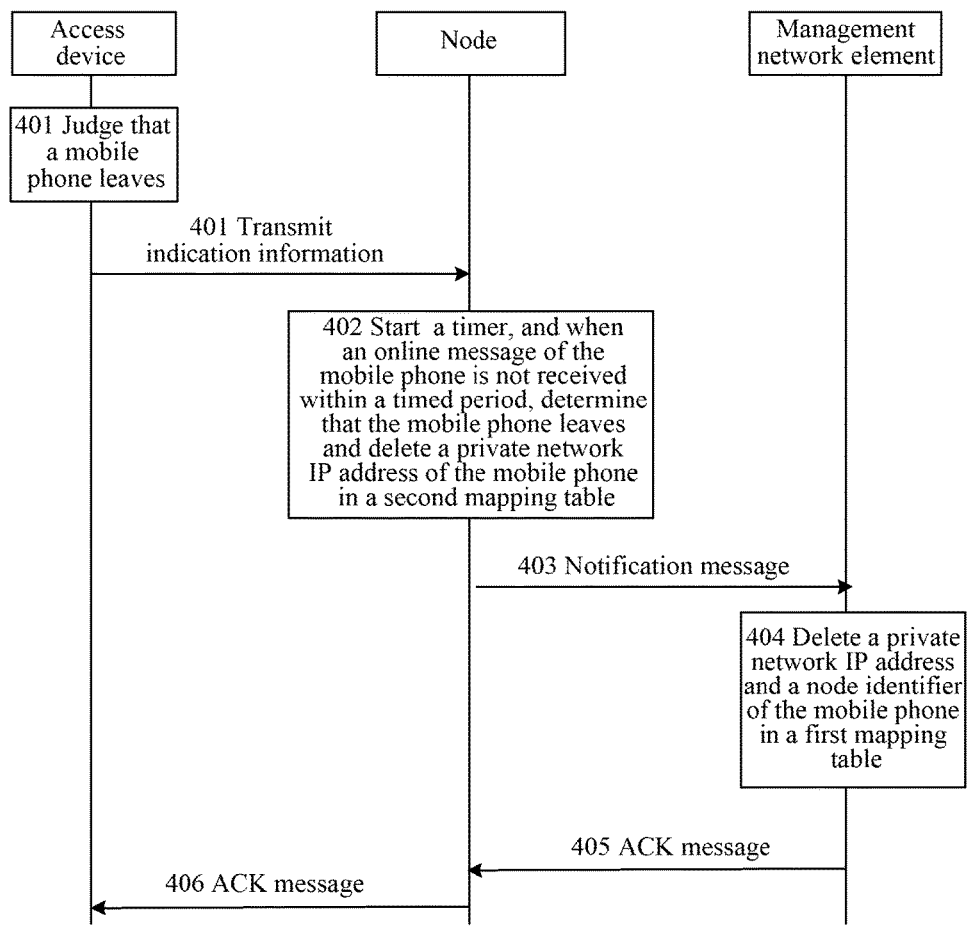
FIG. 4 illustrates a schematic diagram of implementation of a management network element provided by an embodiment of the present disclosure when the management network element learns about that a terminal left a network.

FIG. 4 illustrates a schematic diagram of implementation of a management network element provided by the embodiment of the present disclosure when the management network element learns about that a terminal left a network. FIG. 4 illustrates an application situation that, after a management network element allocates a corresponding network identifier to a terminal, the terminal will leave the network.

In step 401, when an access device judges that a mobile phone leaves a network, the access device transmits indication information that the mobile phone will leave to a node.

Here, the situations that the mobile phone is offline and/or the location of the mobile phone changes are viewed as that the mobile phone leaves the network. The indication information carries terminal information such as IMSI and a private network IP address of the mobile phone which will leave.

In step 402, a node receives the indication information of the access device and starts a timer of the node.

Within a timed period of the timer, if an online message of the mobile phone is not received, the mobile phone leaving the network is finally determined; and after the end of the timed period of the timer, the table entry of private network IP address of the mobile phone in the second mapping table is deleted.

In step 403, the node transmits a notification message to a management network element to notify the management network element that the terminal has already left the network.

Here, the notification message carries the IMSI and the private network IP address of the mobile phone which has left the network.

In step 404, after the management network element receives the notification message, the management network element searches for a table entry corresponding to the IMSI information of the mobile phone in the first mapping table, and deletes the node identifier information to which the mobile phone belongs and deletes the private network IP address of the mobile phone.

In step 405, the management network element transmits an ACK message to the node to notify the node that the corresponding table entry of the mobile phone in the first mapping table has already been deleted.

In step 406, the node transmits an ACK message aiming at the indication information to the access device to notify the access device that the mobile phone has already left the network in deed.

In the solution, when the management network element learns about that a terminal left, the table entries such as private network IP address and node identifier information of the terminal in the first mapping table need to be deleted, but the public network IP address or the public network IP address and the port number segment allocated to the terminal is still reserved, and the reserved content is used as a fixed identity identifier of the terminal in the network, which facilitates the subsequent access of the terminal and also provides a powerful basis for an operator to realize tracing and network security.

In the abovementioned solution, when the interaction between the access device and the node and the interaction between the management network element and the node are involved, the interacted information is transmitted all through operator-defined signaling interfaces.

Figure 5:
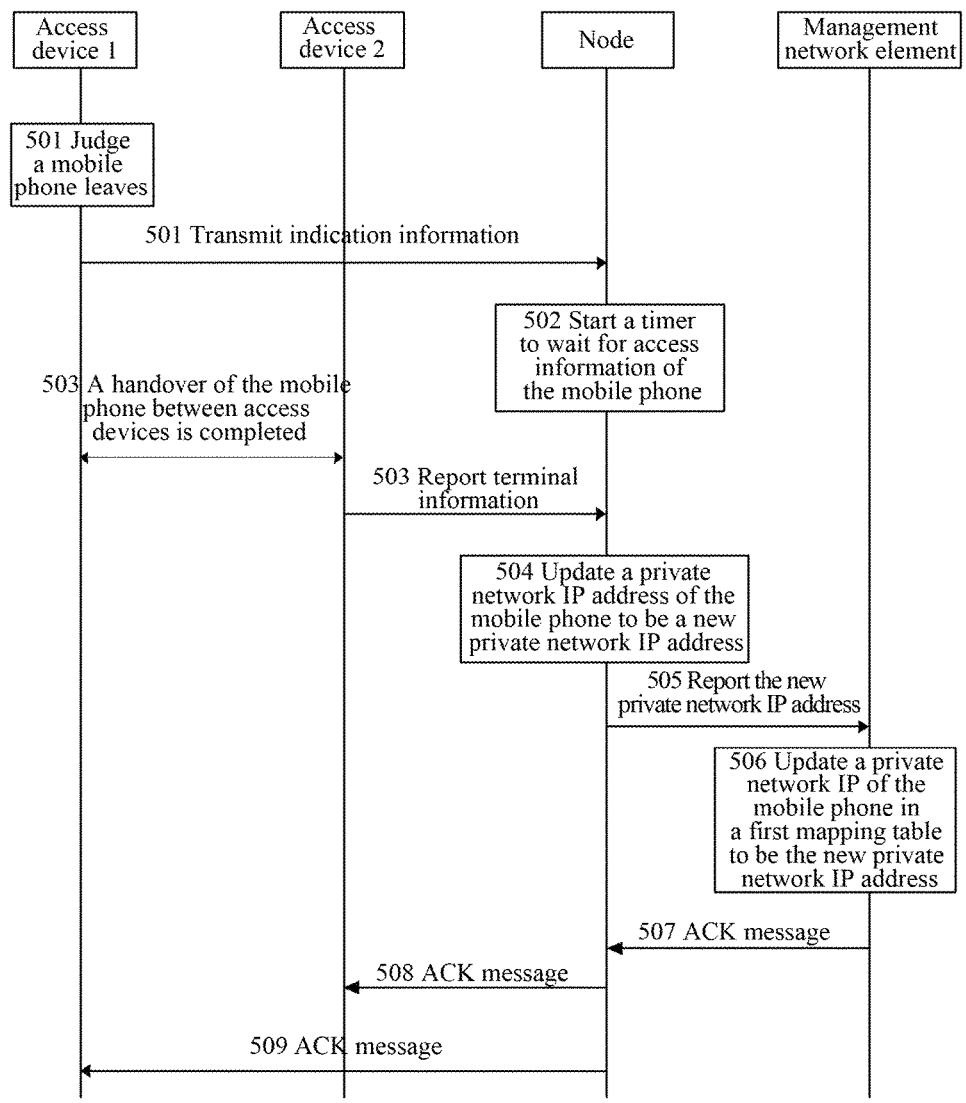
FIG. 5 illustrates a schematic diagram of implementation of a management network element provided by an embodiment of the present disclosure when the management network element learns about that a handover takes place at an access device of a terminal.

FIG. 5 illustrates a schematic diagram of implementation of a management network element provided by an embodiment of the present disclosure when the management network element learns about that a handover was performed on an access device of a terminal. FIG. 5 illustrates an application situation that, after a management network element allocates a corresponding network identifier to a terminal, a handover from an access device 1 to an access device 2 needs to be performed on the terminal and the two access devices belong to the same node.

In step 501, a mobile phone is accessed a network through an access device 1, and when the access device 1 judges that the mobile phone leaves the network, the access device 1 transmits indication information that the mobile phone will leave to a node.

Here, the indication information carries IMSI of the mobile phone which will leave and a private network IP address which is allocated by the access device 1 to the mobile phone.

In step 502, the node receives the indication information of the access device 1 and starts a timer of the node to wait for access information of the mobile phone.

In step 503, within a timed period of the timer, a handover from the access device 1 to an access device 2 is performed on the mobile phone, and after the authentication of an authentication server passes, the access device 2 allocates a new private network IP address to the mobile phone, and uses the IMSI, the new private network IP address and the like of the mobile phone as terminal information and transmits the terminal information to the node to which the access device 2 belongs.

Here, the access device 1 and the access device 2 belong to the same node.

In step 504, before the end of the timed period of the timer, when the node receives the device identifier information of the mobile phone transmitted by the access device 2, the node determines that the mobile phone is online again and closes the timer of the node to stop a timing function of the timer; and the node updates the private network IP address allocated by the access device 1 to the mobile phone in a second mapping table to be the new private network IP address allocated by the access device 2 to the mobile phone.

In step 505, the node reports the new private network IP address information of the mobile phone to a management network element.

In step 506, after the management network element receives the information, the management network element updates the private network IP address of the mobile phone in the first mapping table to be the new private network IP address.

In step 507, the management network element transmits an ACK message to the node to notify the management node that the private network IP address of the mobile phone has already been updated to be the new private network IP address.

In step 508, the node transmits an ACK message to the access device 2 to notify the access device 2 that the mobile phone has already been successfully accessed the network.

In step 509, the node transmits an ACK message to the access device 1 to notify that the mobile phone has already left the access device 1 and a handover to the access device 2 is performed on the mobile phone.

In the abovementioned solution, when the table entry of private network IP address of the mobile phone does not exist in the first mapping table, the steps 506 and 507 are omitted and the steps 508 and 509 are directly executed.

The above solution involves the situation that a handover from the access device 1 to the access device 2 is performed on the terminal and the two access devices belong to the same node, i.e., a handover across the nodes is not performed on the terminal. When a handover across the nodes is performed on the terminal, i.e., a handover from the access device 1 to the access device 2 is performed on the terminal and the two access devices do not belong to the same node, the management network element acquires a new private network IP address allocated to the mobile phone by the new access device, and acquires node identifier information of a new node to which the mobile phone belongs; and updates the private network IP address of the mobile phone in the first mapping table to be the new private network IP address, and updates the node identifier information of the mobile phone in the first mapping table to be the new node identifier information. Herein, a processing process of performing a handover across nodes on the terminal may be approximately divided into two parts, the first part is that the mobile phone is offline at node 1 and the second part is that the mobile phone is online again at node 2. Herein, the process that the mobile phone is offline at node 1 is similar to the abovementioned description of FIG. 5; and the process that the mobile phone is online again at node 2 is similar to the abovementioned description of FIG. 3, and thus no repetitive description is made here.

In the solution, when the management network element learns about that a handover is performed on the access device of the terminal, the management network element needs to update corresponding table entries of the terminal in the first mapping table in time but still reserves the public network IP address or the public network IP address and the port number segment allocated to the terminal, and uses the reserved content as a fixed identity identifier of the terminal in the network, which facilitates the subsequent access of the terminal and also provides a basis for an operator to realize tracing and network security.

It needs to be stated that, in the abovementioned solution, when the interaction between the access device and the node and the interaction between the management network element and the node are involved, the interacted information is transmitted through operator-defined signaling interfaces.

Figure 6:
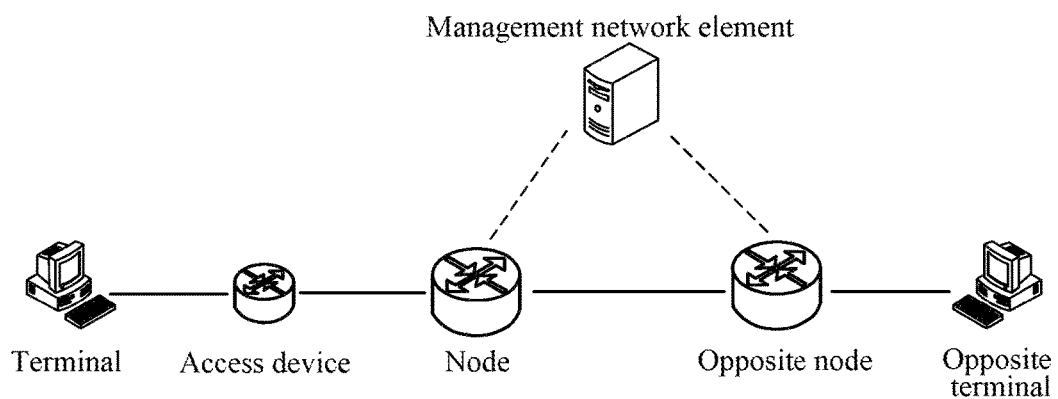
FIG. 6 illustrates a schematic diagram of a second application scenario provided by an embodiment of the present disclosure.

FIG. 6 illustrates a schematic diagram of a second application scenario provided by an embodiment of the present disclosure. In FIG. 6, the scenario may be an application scenario that a terminal and an opposite terminal transmit a data packet by using a network identifier. Herein, the situation that the terminal is a terminal 1, the opposite terminal is a terminal 2, a node to which the terminal 1 belongs is a node 1 and a node to which the terminal 2 belongs is a node 2 is taken as an example.

Figure 7:
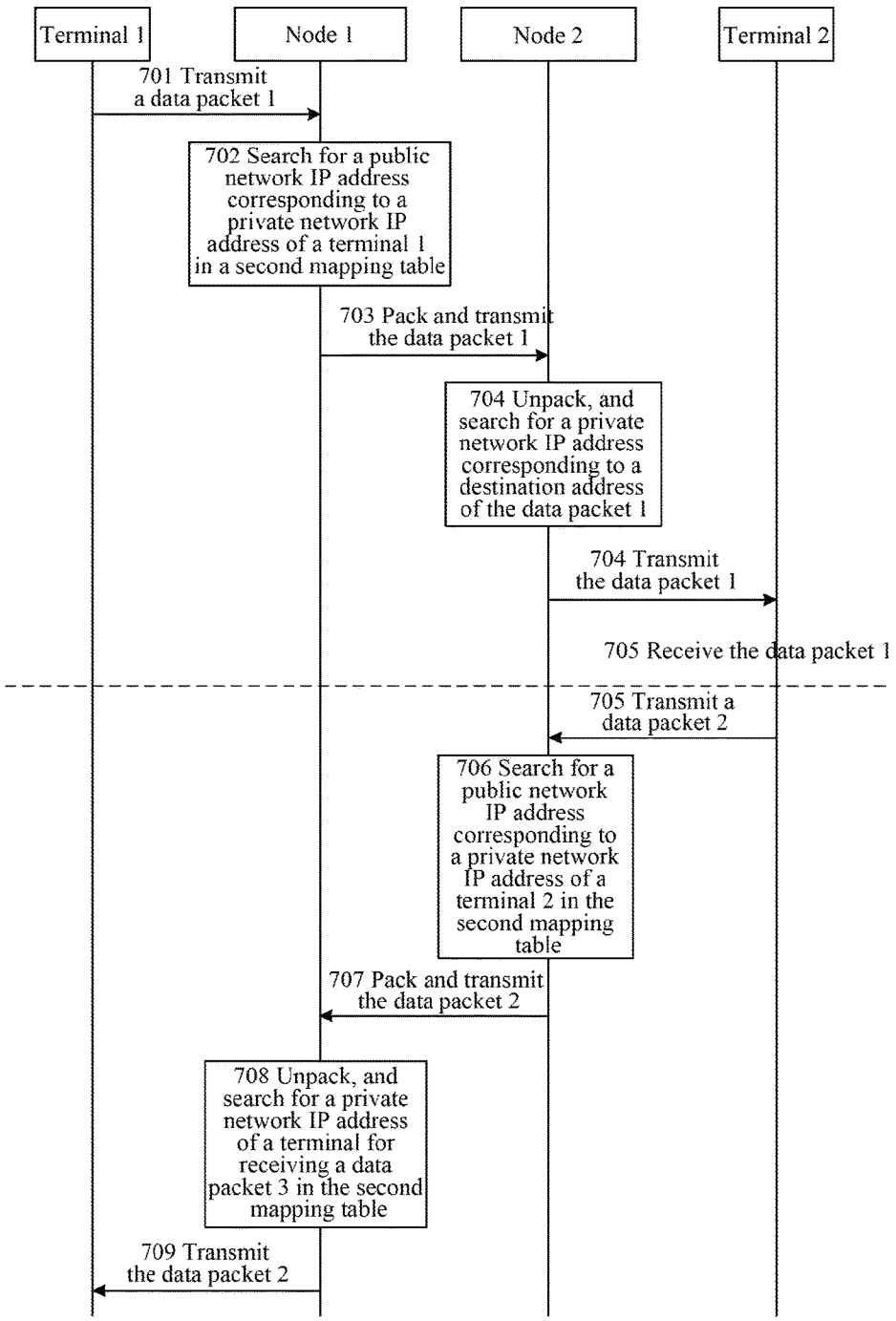
FIG. 7 illustrates a schematic diagram that a terminal transmits a data packet in a network by using an allocated network identifier provided by an embodiment of the present disclosure.

FIG. 7 illustrates a schematic diagram that a terminal transmits a data packet in a network by using an allocated network identifier provided by the embodiment of the present disclosure. The situation that the data packet is transmitted by using the network identifier is further described in combination with FIG. 6 and FIG. 7.

In step 701, the terminal 1 transmits a data packet 1 to the node 1 to which the terminal 1 belongs, to transmit the data packet 1 to the terminal 2 through the node 1.

Here, the data packet 1 carries a source address, a source port number, a destination address and a destination port number of the data packet 1. Usually, the source address is a private network IP address, and the destination address is a public network IP address. For example, the private network IP address of the terminal 1, i.e., the source address of the data packet 1 is 10.1.1.2 and the source port number is 3248.

In step 702, after the node 1 receives the data packet 1 transmitted by the terminal 1, the node 1 searches for the network identifier corresponding to the private network IP address of the terminal 1 in the second mapping table.

Here, in the first mapping table, the node 1 searches that the public network IP address corresponding to the private network IP address 10.1.1.2 of the terminal 1 is 123.1.1.2 and the port number segment is [1024, 2047]. Accordingly, it can be seen that the IP address of the data packet 1 is translated from the source address 10.1.1.2 and the source port number 3248 into the public network IP address 123.1.1.2 and the port number 2035, and the node records the translation relation.

In step 703, the node 1 packs the data packet and then transmits the data packet 1 to the node 2 through a data tunnel by using the searched public network IP address.

Here, the node 1 transmits the data packet 1 to the node 2 by using the public network IP address 123.1.1.2.

In step 704, the node 2 receives the data packet 1 through the data tunnel, and unpacks the data packet 1.

When determining that the terminal 2 is a private network user, the node 2 searches for a private network IP address and a port number of the terminal corresponding to the destination address and the destination port number of the data packet 1 in the second mapping table of the node 2, and determines a terminal with the private network IP address and the port number to be the terminal 2 and transmits the data packet 1 to the terminal 2.

When determining that the terminal 2 is a public network user, other operations do not need to be executed again.

In step 705, the terminal 2 receives the data packet 1 from the terminal 1 and transmits a response message, such as a data packet 2, of the data packet 1 to the node 2 to return the data packet 2 to the terminal 1 through the node 2.

In step 706, the node 2 receives the data packet 2.

When determining that a receiving party (terminal 1) of the data packet 2 is a private network user, a public network IP address or the public network IP and a port number corresponding to the private network IP address of the terminal 2 is searched for in the second mapping table, and the step 707 is sequentially executed.

When determining that the receiving part of the data packet 2 is a public network user, the data packet 2 is packed and transmitted to the public network user; and this process ends.

Here, since the data packet 2 is a response data packet of the data packet 1, that is, the node 2 knows the node 1. However, when the node 2 transmits a data packet 3 to the terminal 1 and does not know the node identifier to which the terminal 1 belongs, the node 2 needs to transmit a query request to the management network element, and the management network element uses the destination address (or the destination address and port number) of the data packet 3 as an index to search for the node identifier to which the terminal corresponding to the destination address belongs, and determines the node with the node identifier to be a receiving node of the data packet 3. Herein, the data packet 3 carries a source address and a destination address; and the source address of the data packet 3 is the private network IP address of the terminal 2.

In step 707, the data packet 2 is packed and the data packet 2 is transmitted to the node 1 through the data tunnel by using the searched public network IP address.

In step 708, the node 1 receives the data packet 2 through the data tunnel and unpacks the data packet 2; and searches for the private network IP address and the port number of the terminal corresponding to the destination address and the port number of the data packet 2 in the second mapping table, and determines the terminal with the private network IP address and the port number to be a receiving party of the data packet 2.

In step 709, the node 1 transmits the data packet 2 to the terminal 1.

Herein, in steps 701-705, the terminal 1 is a transmitting party of the data packet 1 and the terminal 2 is a receiving party. In steps 706-709, the terminal 2 is a transmitting party of the data packet 2 and the terminal 1 is a receiving party. No matter which is the transmitting party and which is the receiving party, the translation from the private network IP address to the public network IP address and/or from the public network IP address to the private network IP address can all be performed according to the second mapping table of the node to which the terminal belongs.

In the abovementioned solution, when the data packet is transmitted between the transmitting terminal and the receiving terminal, at the transmitting party, the second mapping table of the node to which the transmitting party belongs may be used to search for the public network IP address corresponding to the private network IP address of the transmitting terminal such that the data packet is transmitted in the Internet by using the public network IP address; and at the receiving party, the second mapping table of the node to which the receiving terminal belongs may be used to search for the private network IP address of the terminal corresponding to the destination node (the public network IP address of the receiving terminal) of the data packet, and the terminal with the private network IP address is the receiving terminal, such that the transmission of the data packet is facilitated and simultaneously the identity of the terminal is also identified.

In the abovementioned solution, when the interaction between the management network element and the node is involved, the interacted information is transmitted through operator-defined data interfaces.

Figure 8:
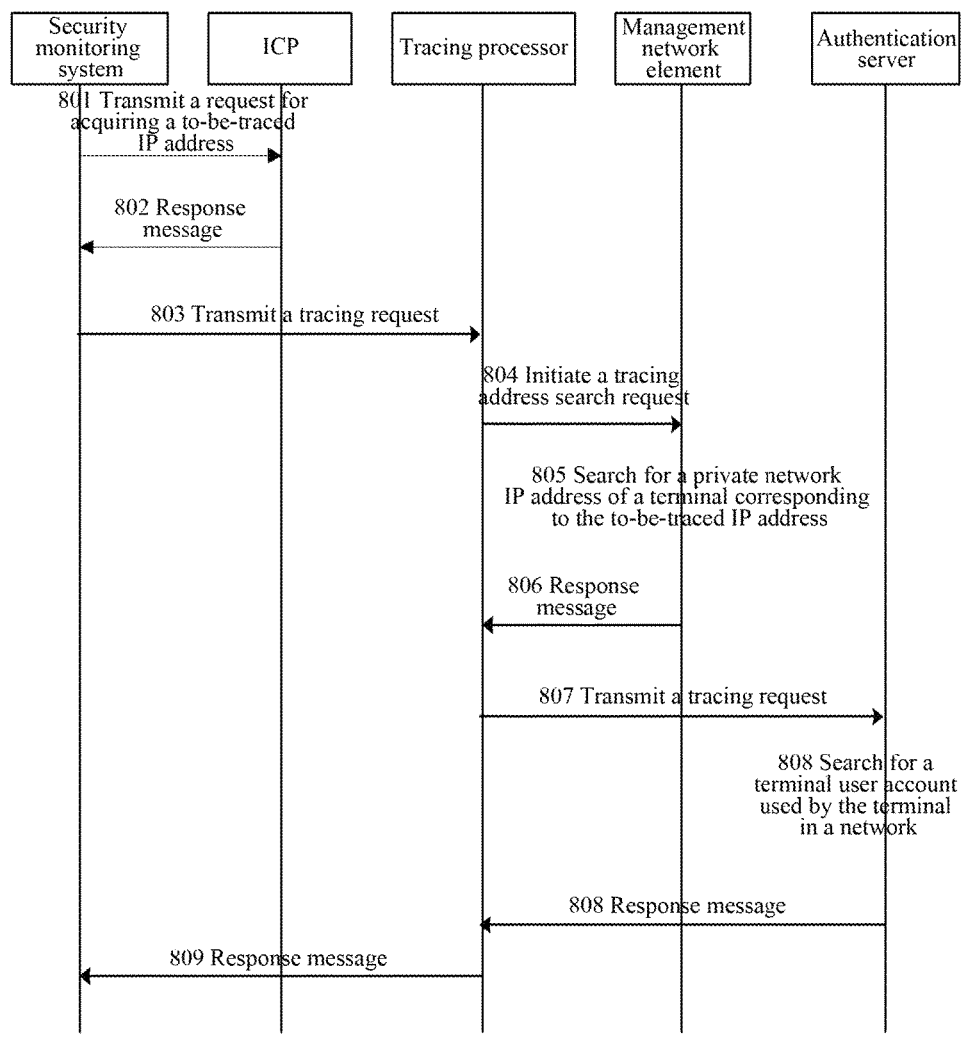
FIG. 8 illustrates a schematic diagram of a first embodiment of implementing tracing provided by the present disclosure.

FIG. 8 illustrates a schematic diagram of a first embodiment of implementing tracing provided by the present disclosure. As illustrated in FIG. 8, how this solution facilitates implementation of tracing performed by an operator may be deeply understood. In addition to a management network element and an authentication server, communication devices involved in FIG. 8 further include a security monitoring system, an Internet Content Provider ICP, a tracing processor, etc.

In step 801, when a security monitoring system monitors that an event which affects network security occurs, i.e., there is a terminal performing an illegal operation in a network, the security monitoring system transmits a request for acquiring a to-be-traced IP address to an ICP.

In step 802, the ICP returns the to-be-traced IP address at which the illegal operation occurs as a response message of the request to the security monitoring system.

The to-be-traced IP address acquired by the ICP is a public network IP address or a public network IP address and a port number.

In step 803, the security monitoring system transmits a tracing request to a tracing processor to acquire a terminal user account of the to-be-traced IP address.

Here, the tracing request carries the to-be-traced IP address.

In step 804, after the tracing processor receives the tracing request transmitted by the security monitoring system, the tracing processor initiates a tracing address search request to a management network element.

Here, the tracing address search request carries the to-be-traced IP address.

In step 805, the management element searches for a private network IP address and a node identifier of a terminal corresponding to the to-be-traced IP address in the first mapping table.

Here, since the first mapping table records information such as device identifiers of terminals, private network IP addresses, network identifiers and node identifiers to which the terminal belongs and so on, herein, one private network IP address of the terminal corresponds to one unique network identifier (public network IP address and port number segment), the management network element may also search for information such as the private IP address and the node identifier to which the terminal belongs of the terminal corresponding to the to-be-traced IP address in the first mapping table according to the to-be-traced public network IP address and the port number.

In step 806, the management network element uses the searched private network IP address and node identifier as a response message of the to-be-traced address search request and returns the response message to the tracing processor.

In step 807, after the tracing processor receives the response message, the tracing processor transmits a tracing request to an authentication server.

In step 808, the authentication server receives the tracing request, and searches for the terminal user account used by the terminal with the private network IP address in the network according to the private network IP address and terminal authentication information, and uses the terminal user account information as a response message of the tracing request and returns the response message to the tracing processor.

In step 809, the tracing processor uses the terminal user account information as a response message of the tracing request transmitted by the security monitoring system to the tracing processor, and returns the response message to the security monitoring system.

In the abovementioned solution, since the management unit allocates a unique network identifier to each terminal and records information such as device identifiers of terminals, network identifiers, private network IP address of terminals and node identifiers to which the terminal belongs and so on in the first mapping table, the terminal which performs the illegal operation may be quickly searched for according to the network identifier based on the records in the first mapping table, and the implementation of tracing performed by the operators on the illegal terminal is facilitated. Compared with the method of implementing tracing by searching for a log server in the related art, by using this solution, not only can the illegal terminal be positioned in real time and the service demands be satisfied, but also the waste of storage resources caused by deployment of the log server to uniformly maintain address translation logs is avoided.

Figure 9:
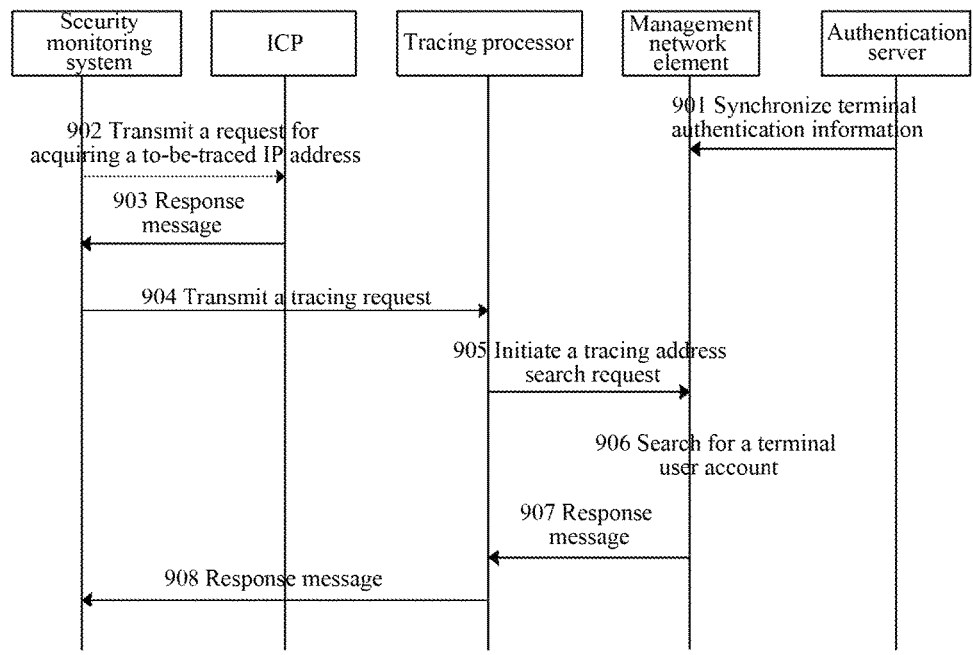
FIG. 9 illustrates a schematic diagram of a second embodiment of implementing tracing provided by the present disclosure.

FIG. 9 illustrates a schematic diagram of a second embodiment of implementing tracing provided by the present disclosure. As illustrated in FIG. 9, how this solution facilitates better implementation of tracing performed by an operator may be deeply understood.

In step 901, after an authentication server performs authentication on a terminal, the authentication server synchronizes terminal authentication information to a management network element.

Here, the authentication information includes: a terminal user account, a password, a user type and authorities, used by the terminal.

In step 902, when a security monitoring system monitors that an event which affects network security occurs, i.e., there is a terminal performing an illegal operation in a network, the security monitoring system transmits a request for acquiring a to-be-traced IP address to an ICP.

In step 903, the ICP returns the to-be-traced IP address at which the illegal operation occurs as a response message of the request to the security monitoring system.

Usually, the to-be-traced IP address acquired by the ICP is a public network IP address or a public network IP address and a port number.

In step 904, the security monitoring system transmits a tracing request to a tracing processor to acquire a terminal user account of the to-be-traced IP address.

Here, the tracing request carries the to-be-traced IP address.

In step 905, after the tracing processor receives the tracing request transmitted by the security monitoring system, the tracing processor initiates a tracing address search request to the management network element.

Here, the tracing address search request carries the to-be-traced IP address.

In step 906, the management element searches for a device identifier of a terminal corresponding the to-be-traced IP address in the first mapping table; and searches for a terminal user account used by the terminal with the device identifier in pre-synchronized terminal authentication information according to the device identifier.

In step 907, the management network element uses the searched private network IP address and node identifier as a response message of the to-be-traced address search request and returns the response message to the tracing processor.

In step 908, the tracing processor users the terminal user account information as a response message of the tracing request transmitted by the security monitoring system to the tracing processor, and returns the response message to the security monitoring system.

In the abovementioned solution, the authentication server synchronizes the terminal authentication information including the terminal user account to the management network element. When terminal tracing is implemented, the management network element may search for the corresponding device identifier through the to-be-traced IP address, and then searches for the user account of the to-be-traced terminal by using the device identifier. Through the pre-synchronization of the authentication information, quick tracing and positioning may be realized, and the searching time is saved and the demands of operators in aspects such as tracing and security are satisfied.

The embodiment of the present disclosure further provides a computer storage medium t storing computer-executable instructions therein, and the computer-executable instructions are used for executing the aforementioned method for acquiring the identifier of the terminal in the network.

Figure 10:
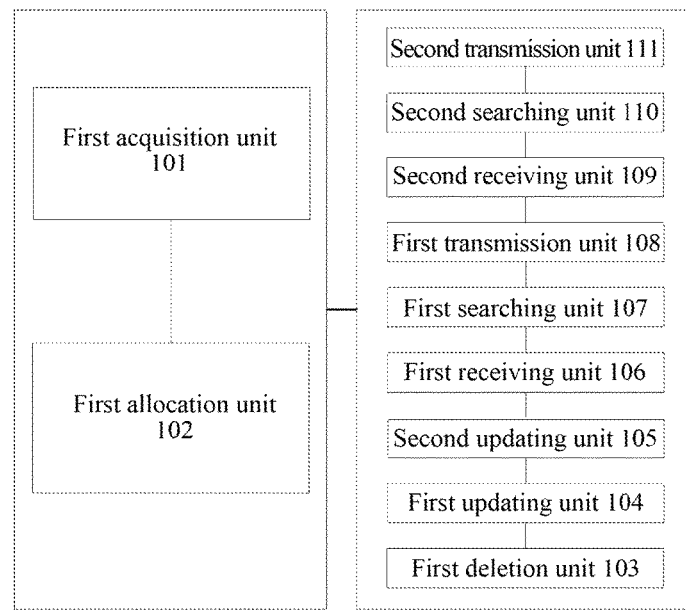
FIG. 10 illustrates a schematic diagram of the composition of a management network element provided by an embodiment of the present disclosure.

The embodiment of the present disclosure further provides a management network element. FIG. 10 illustrates a schematic diagram of components of a management network element provided by the embodiment of the present disclosure. As illustrated in FIG. 10, the network element includes: a first acquisition unit 101 and a first allocation unit 102, herein, the first acquisition unit 101 is arranged to acquire a device identifier of a current terminal which is registered in a network, herein, the current terminal is a mobile user; and the first allocation unit 102 is arranged to allocate a corresponding network identifier to the current terminal according to the device identifier of the current terminal such that the current terminal transmits data in the network by using the allocated network identifier. Herein, the network identifier is a fixed public network Internet Protocol IP address or a fixed public network IP address and port number segment, allocated to the current terminal.

In the solution, the first allocation unit 102 is further arranged to search to determine whether there is the public network IP address or the public network IP address and the port number segment corresponding to the device identifier of the current terminal in a preconfigured first mapping table; when the public network IP address or the public network IP address and the port number segment is searched out, allocate the searched public network IP address or public network IP address and port number segment to the current terminal; and when the public network IP address or the public network IP address and the port number segment is not searched out, select an idle public network IP address, or an idle public network IP address and an idle port number segment, or a non-idle public network IP address and an idle port number segment as a network identifier of the current terminal, and allocate the network identifier to the current terminal. Herein, the first mapping table records a corresponding relation between terminal device identifiers and network identifiers.

Herein, the first acquisition unit 101 is further arranged to acquire identifier information of a node to which the current terminal belongs, and add the node identifier information to the first mapping table; or, acquire a private network IP address allocated to the current terminal by an access device which the current terminal is accessed and identifier information of a node to which the current terminal belongs, and add the private network IP address and the node identifier information to the first mapping table.

As illustrated in FIG. 10, the network element further includes:

a first deletion unit 103 arranged to, when learning about that the current terminal left the network, delete the node identifier information, or the private network IP address and the node identifier information corresponding to the identifier of the current terminal in the first mapping table;

a first updating unit 104 arranged to, when learning about that a handover from the access device to a new access device was performed on the current terminal and the two access devices belong to the same node, acquire a new private network IP address allocated to the current terminal by the new access device, and update the private network IP address of the current terminal in the first mapping table to be the new private network IP address; and a second updating unit 105 arranged to, when learning about that a handover from the access device to a new access device was performed on the current terminal and the two access devices do not belong to the same node, acquire a new private network IP address allocated to the current terminal by the new access device, and acquire node identifier information of a new node to which the current terminal belongs; and update the private network IP address of the current terminal in the first mapping table to be the new private network IP address, and update the node identifier information of the current terminal in the first mapping table to be the new node identifier information.

As illustrated in FIG. 10, the network element further includes:

a first receiving unit 106 arranged to receive a tracing address search request which carries a to-be-traced IP address;

a first searching unit 107 arranged to search for a private network IP address or the private network IP address and a node identifier of a terminal corresponding to the to-be-traced IP address; and a first transmission unit 108 arranged to use the private network IP address or the private network IP address and the node identifier information as a response message of the tracing address search request, and transmit the response message;

or, the first receiving unit 106 arranged to receive a tracing address search request which carries a to-be-traced IP address;

the first searching unit 107 arranged to search for a terminal device identifier corresponding to the to-be-traced IP address in the first mapping table, and then search for a terminal user account corresponding to the terminal device identifier in pre-synchronized terminal authentication information; and the first transmission unit 108 arranged to use the terminal user account information as a response message of the tracing address search request, and transmit the response message, herein, the to-be-traced IP address is the public network IP address or the public network IP address and the port number.

As illustrated in FIG. 10, the network element further includes:

a second receiving unit 109 arranged to receive a query request, herein the query request is transmitted by the node when the node does not learn about identifier information of the node used for receiving first data when the current terminal transmits the first data;

a second searching unit 110 arranged to search for an identifier of a node to which a terminal corresponding to a destination address of the first data belongs in the first mapping table; and a second transmission unit 111 arranged to transmit the node identifier information to the node.

One skilled in the art shall understand that the implementing function of each processing unit in the management network element illustrated in FIG. 10 may be understood by referring the relevant description of the aforementioned method for acquiring the identifier of the terminal in the network. One skilled in the art shall understand that the function of each processing unit in the management network element illustrated in FIG. 10 may be implemented through a program which runs on a processor and may also be implemented through a specific logic circuit.

In actual application, the first acquisition unit 101, the first allocation unit 102, the first deletion unit 103, the first updating unit 104, the second updating unit 105, the first receiving unit 106, the first searching unit 107, the first transmission unit 108, the second receiving unit 109, the second searching unit 110 and the second transmission unit 111 may all be implemented by a Central Processing Unit CPU, or a Digital Signal Processor DSP, or a Micro Processing Unit MPU, or a Field Programmable Gate Array FPGA, etc.

One skilled in the art shall understand that the embodiments of the present disclosure may be provided in the form of methods, systems or computer program products. Therefore, the present disclosure may adopt the form of hardware embodiments, software embodiments or combined software and hardware embodiments. In addition, the present disclosure may adopt the form of computer program products implemented based on one or more of computer usable memory media (including but not limited to disk memories and optical memories, etc.) containing computer usable program codes therein.

The present disclosure is described by referring to flowcharts and/or block diagrams of the method, the device (system) and the computer program products according to the embodiments of the present disclosure. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded processors or other programmable data processing devices to produce a machine, such that instructions executed through processors of computers or other programmable data processing devices produce apparatuses for implementing functions designated in one process or more processes of the flowcharts and/or one block or more blocks of the block diagrams.

These computer program instructions may also be stored in computer-readable memories which can guide computers or other programmable data processing devices to work in a specific manner, such that the instructions stored in the computer-readable memories produce manufactures including instruction apparatuses, and the instruction apparatuses realize functions designated in one process or more processes in the flowcharts and/or one block or more blocks in the block diagrams.

These computer program instructions may also be loaded to computers or other programmable data processing devices, such that a series of operation steps are executed on the computers or other programmable devices to form the processing realized by the computers, such that the instructions which are executed on the computers or other programmable devices provide steps for realizing functions designated in one process or more processes in the flowcharts and/or one block or more blocks in the block diagrams.

What are described above are just alternative embodiments of the present disclosure and are not used for limiting the protection scope of the present disclosure.

INDUSTRIAL APPLICABILITY

In the embodiments of the present disclosure, a device identifier of a current terminal which is registered in a network is acquired; and a corresponding network identifier is allocated to the current terminal according to the device identifier of the current terminal such that the current terminal transmits data in the network by using the allocated network identifier. Herein, the network identifier is a fixed public network IP address allocated to the current terminal or the a fixed public network IP address and the port number segment, allocated to the current terminal, and the fixed identity of the mobile user can be identified in the network to satisfy the demands of operators in aspects such as tracing and security and so on.

What is claimed is:

1. A method for acquiring an identifier of a terminal in a network, comprising:

acquiring a device identifier of a current terminal which is registered in a network, wherein the current terminal is a mobile user; and allocating a corresponding network identifier to the current terminal according to the device identifier of the current terminal such that the current terminal transmits data in the network by using the allocated network identifier;

wherein, the network identifier is a fixed public network Internet Protocol, IP, address or a fixed public network IP address and port number segment, allocated to the current terminal;

wherein, said allocating a corresponding network identifier to the current terminal according to the device identifier of the current terminal comprises:

searching to determine whether there is the public network IP address or the public network IP address and the port number segment, corresponding to the device identifier of the current terminal, in a preconfigured first mapping table;

allocating the searched public network IP address or public network IP address and port number segment to the current terminal when the public network IP address or the public network IP address and the port number segment is searched out; and selecting an idle public network IP address, or an idle public network IP address and an idle port number segment, or a non-idle public network IP address and an idle port number segment as a fixed network identifier of the current terminal to allocate to the current terminal when the public network IP address or the public network IP address and port number segment is not searched out;

wherein, the first mapping table records a corresponding relation between terminal device identifiers and network identifiers.

2. The method according to claim 1, wherein, the method further comprises:

acquiring identifier information of a node to which the current terminal belongs, and adding the node identifier information to the first mapping table; or, acquiring a private network IP address allocated to the current terminal by an access device which the current terminal is accessed and the identifier information of the node to which the current terminal belongs, and adding the private network IP address and the node identifier information to the first mapping table.

3. The method according to claim 2, wherein, after adding the node identifier information to the first mapping table or adding the private network IP address and the node identifier information to the first mapping table, the method further comprises:

when learning about that the current terminal left the network, deleting the node identifier information, or the private network IP address and the node identifier information corresponding to an identifier of the current terminal in the first mapping table;

when learning about that a handover from the access device to a new access device was performed on the current terminal and the two access devices belong to a same node, acquiring a new private network IP address allocated to the current terminal by the new access device, and updating the private network IP address of the current terminal in the first mapping table to be the new private network IP address; and when learning about that a handover from the access device to a new access device was performed on the current terminal and the two access devices do not belong to a same node, acquiring a new private network IP address allocated to the current terminal by the new access device, acquiring node identifier information of a new node to which the current terminal belongs; and updating the private network IP address of the current terminal in the first mapping table to be the new private network IP address, and updating the node identifier information of the current terminal in the first mapping table to be the new node identifier information.

4. The method according to claim 2, wherein, the method further comprises:
when receiving a tracing address search request which carries a to-be-traced IP address, searching for a private network IP address or the private network IP address and a node identifier of a terminal corresponding to the to-be-traced IP address in the first mapping table, and using the private network IP address or the private network IP address and the node identifier information as a response message of the tracing address search request, and transmitting the response message;
or,
when receiving the tracing address search request which carries the to-be-traced IP address, searching for a terminal device identifier corresponding to the to-be-traced IP address in the first mapping table; and then searching for a terminal user account corresponding to the terminal device identifier in pre-synchronized terminal authentication information, using the terminal user account information as the response message of the tracing address search request, and transmitting the response message;
wherein, the to-be-traced IP address is a public network IP address or a public network IP address and a port number.

5. The method according to claim 2, wherein, the method further comprises:
a management network element transmitting the network identifier allocated to the current terminal to the node to which the current terminal belongs such that the node forms a second mapping table, wherein the second mapping table records a corresponding relation among the device identifier, the network identifier and the private network IP address of the current terminal; and
correspondingly, the current terminal transmitting data in the network by using the allocated network identifier comprises:
when the node acquires first data from the current terminal, acquiring the private network IP address of the current terminal, and searching for the network identifier corresponding to the private network IP address in the second mapping table;
when the node learns about identifier information of a node used for receiving the first data, determining the node used for receiving the first data;
when the node does not learn about the identifier information of the node used for receiving the first data, transmitting a query request to the management network element, and the management network element receiving the query request, searching for an identifier of a node to which a terminal corresponding to a destination address of the first data belongs in the first mapping table, and transmitting the searched node identifier; and the node receiving the node identifier searched out by the management network element, and determining a node with the node identifier as the node used for receiving the first data; and the node transmitting the first data to the determined node used for receiving the first data through a data tunnel by using the network identifier searched out by the node.

6. A management network element, comprising:
a first acquisition unit, arranged to acquire a device identifier of a current terminal which is registered in a network, wherein the current terminal is a mobile user; and
a first allocation unit, arranged to allocate a corresponding network identifier to the current terminal according to the device identifier of the current terminal such that the current terminal transmits data in the network by using the allocated network identifier;
wherein, the network identifier is a fixed public network Internet Protocol, IP, address or a fixed public network IP address and port number segment, allocated to the current terminal;
wherein, the first allocation unit is further arranged to:
search to determine whether there is the public network IP address or the public network IP address and the port number segment corresponding to the device identifier of the current terminal in a preconfigured first mapping table;
when the public network IP address or the public network IP address and the port number segment is searched out, allocate the searched public network IP address or public network IP address and port number segment to the current terminal; and
when the public network IP address or the public network IP address and the port number segment is not searched out, select an idle public network IP address, or an idle public network IP address and an idle port number segment, or a non-idle public network IP address and an idle port number segment as a fixed network identifier of the current terminal to allocate to the current terminal;
wherein, the first mapping table records a corresponding relation between terminal device identifiers and network identifiers.

7. The management network element according to claim 6, wherein, the first acquisition unit is further arranged to:
acquire identifier information of a node to which the current terminal belongs, and add the node identifier information to the first mapping table; or,
acquire a private network IP address allocated to the current terminal by an access device which the current terminal is accessed and the identifier information of the node to which the current terminal belongs, and add the private network IP address and the node identifier information to the first mapping table.

8. The management network element according to claim 7, wherein, the management network element further comprises:
a first deletion unit arranged to, when learning about that the current terminal left the network, delete the node identifier information, or the private network IP address and the node identifier information corresponding to an identifier of the current terminal in the first mapping table;
a first updating unit arranged to, when learning about that a handover from the access device to a new access device was performed on the current terminal and the two access devices belong to a same node, acquire a new private network IP address allocated to the current terminal by the new access device, and update the private network IP address of the current terminal in the first mapping table to be the new private network IP address; and a second updating unit arranged to, when learning about that a handover from the access device to a new access device was performed on the current terminal and the two access devices do not belong to a same node, acquire the new private network IP address allocated to the current terminal by the new access device, acquire node identifier information of a new node to which the current terminal belongs, update the private network IP address of the current terminal in the first mapping table to be the new private network IP address, and update the node identifier information of the current terminal in the first mapping table to be the new node identifier information.

9. The management network element according to claim 7, wherein, the management network element further comprises:

a first receiving unit arranged to receive a tracing address search request which carries a to-be-traced IP address;

a first searching unit arranged to search for a private network IP address or the private network IP address and a node identifier of a terminal corresponding to the to-be-traced IP address; and a first transmission unit arranged to use the private network IP address or the private network IP address and the node identifier information as a response message of the tracing address search request, and transmit the response message;

or, the first receiving unit arranged to receive the tracing address search request which carries the to-be-traced IP address;

the first searching unit arranged to search for a terminal device identifier corresponding to the to-be-traced IP address in the first mapping table, and then search for a terminal user account corresponding to the terminal device identifier in pre-synchronized terminal authentication information; and the first transmission unit arranged to use the terminal user account information as the response message of the tracing address search request, and transmit the response message, wherein, the to-be-traced IP address is a public network IP address, or a public network IP address and a port number.

10. The management network element according to claim 7, wherein, the management network element further comprises:

a second receiving unit arranged to receive a query request, wherein the query request is transmitted by the node when the node does not learn about identifier information of a node used for receiving first data when the current terminal transmits the first data;

a second searching unit arranged to search for an identifier of the node to which a terminal corresponding to a destination address of the first data belongs in the first mapping table; and a second transmission unit arranged to transmit the node identifier information.

11. A non-transitory computer storage medium storing computer-executable instructions therein, wherein the computer-executable instructions are used for executing a method for acquiring an identifier of a terminal in a network, comprising:

acquiring a device identifier of a current terminal which is registered in a network, wherein the current terminal is a mobile user; and allocating a corresponding network identifier to the current terminal according to the device identifier of the current terminal such that the current terminal transmits data in the network by using the allocated network identifier;

wherein, the network identifier is a fixed public network Internet Protocol, IP, address or a fixed public network IP address and port number segment, allocated to the current terminal;

wherein, said allocating a corresponding network identifier to the current terminal according to the device identifier of the current terminal comprises:

searching to determine whether there is the public network IP address or the public network IP address and the port number segment, corresponding to the device identifier of the current terminal, in a preconfigured first mapping table;

allocating the searched public network IP address or public network IP address and port number segment to the current terminal when the public network IP address or the public network IP address and the port number segment is searched out; and selecting an idle public network IP address, or an idle public network IP address and an idle port number segment, or a non-idle public network IP address and an idle port number segment as a fixed network identifier of the current terminal to allocate to the current terminal when the public network IP address or the public network IP address and port number segment is not searched out;

wherein, the first mapping table records a corresponding relation between terminal device identifiers and network identifiers.

12. The non-transitory computer storage medium according to claim 11, wherein the method further comprises:

acquiring identifier information of a node to which the current terminal belongs, and adding the node identifier information to the first mapping table; or, acquiring a private network IP address allocated to the current terminal by an access device which the current terminal is accessed and the identifier information of the node to which the current terminal belongs, and adding the private network IP address and the node identifier information to the first mapping table.

13. The non-transitory computer storage medium according to claim 12, wherein, after adding the node identifier information to the first mapping table or adding the private network IP address and the node identifier information to the first mapping table, the method further comprises:

when learning about that the current terminal left the network, deleting the node identifier information, or the private network IP address and the node identifier information corresponding to an identifier of the current terminal in the first mapping table;

when learning about that a handover from the access device to a new access device was performed on the current terminal and the two access devices belong to a same node, acquiring a new private network IP address allocated to the current terminal by the new access device, and updating the private network IP address of the current terminal in the first mapping table to be the new private network IP address; and when learning about that a handover from the access device to a new access device was performed on the current terminal and the two access devices do not belong to a same node, acquiring a new private network IP address allocated to the current terminal by the new access device, acquiring node identifier information of a new node to which the current terminal belongs; and updating the private network IP address of the current terminal in the first mapping table to be the new private network IP address, and updating the node identifier information of the current terminal in the first mapping table to be the new node identifier information.

14. The non-transitory computer storage medium according to claim 12, wherein the method further comprises:
when receiving a tracing address search request which carries a to-be-traced IP address, searching for a private network IP address or the private network IP address and a node identifier of a terminal corresponding to the to-be-traced IP address in the first mapping table, and using the private network IP address or the private network IP address and the node identifier information as a response message of the tracing address search request, and transmitting the response message;
or,
when receiving the tracing address search request which carries the to-be-traced IP address, searching for a terminal device identifier corresponding to the to-be-traced IP address in the first mapping table; and then searching for a terminal user account corresponding to the terminal device identifier in pre-synchronized terminal authentication information, using the terminal user account information as the response message of the tracing address search request, and transmitting the response message;
wherein, the to-be-traced IP address is a public network IP address or a public network IP address and a port number.

15. The non-transitory computer storage medium according to claim 12, wherein the method further comprises:
a management network element transmitting the network identifier allocated to the current terminal to the node to which the current terminal belongs such that the node forms a second mapping table, wherein the second mapping table records a corresponding relation among the device identifier, the network identifier and the private network IP address of the current terminal; and
correspondingly, the current terminal transmitting data in the network by using the allocated network identifier comprises:
when the node acquires first data from the current terminal, acquiring the private network IP address of the current terminal, and searching for the network identifier corresponding to the private network IP address in the second mapping table;
when the node learns about identifier information of a node used for receiving the first data, determining the node used for receiving the first data;
when the node does not learn about the identifier information of the node used for receiving the first data, transmitting a query request to the management network element, and the management network element receiving the query request, searching for an identifier of a node to which a terminal corresponding to a destination address of the first data belongs in the first mapping table, and transmitting the searched node identifier; and the node receiving the node identifier searched out by the management network element, and determining a node with the node identifier as the node used for receiving the first data; and
the node transmitting the first data to the determined node used for receiving the first data through a data tunnel by using the network identifier searched out by the node.

* * * * *